March 1, 1938. G. D. BISHOP 2,109,765
PACKAGING OF FRUITS AND VEGETABLES
Filed May 12, 1933
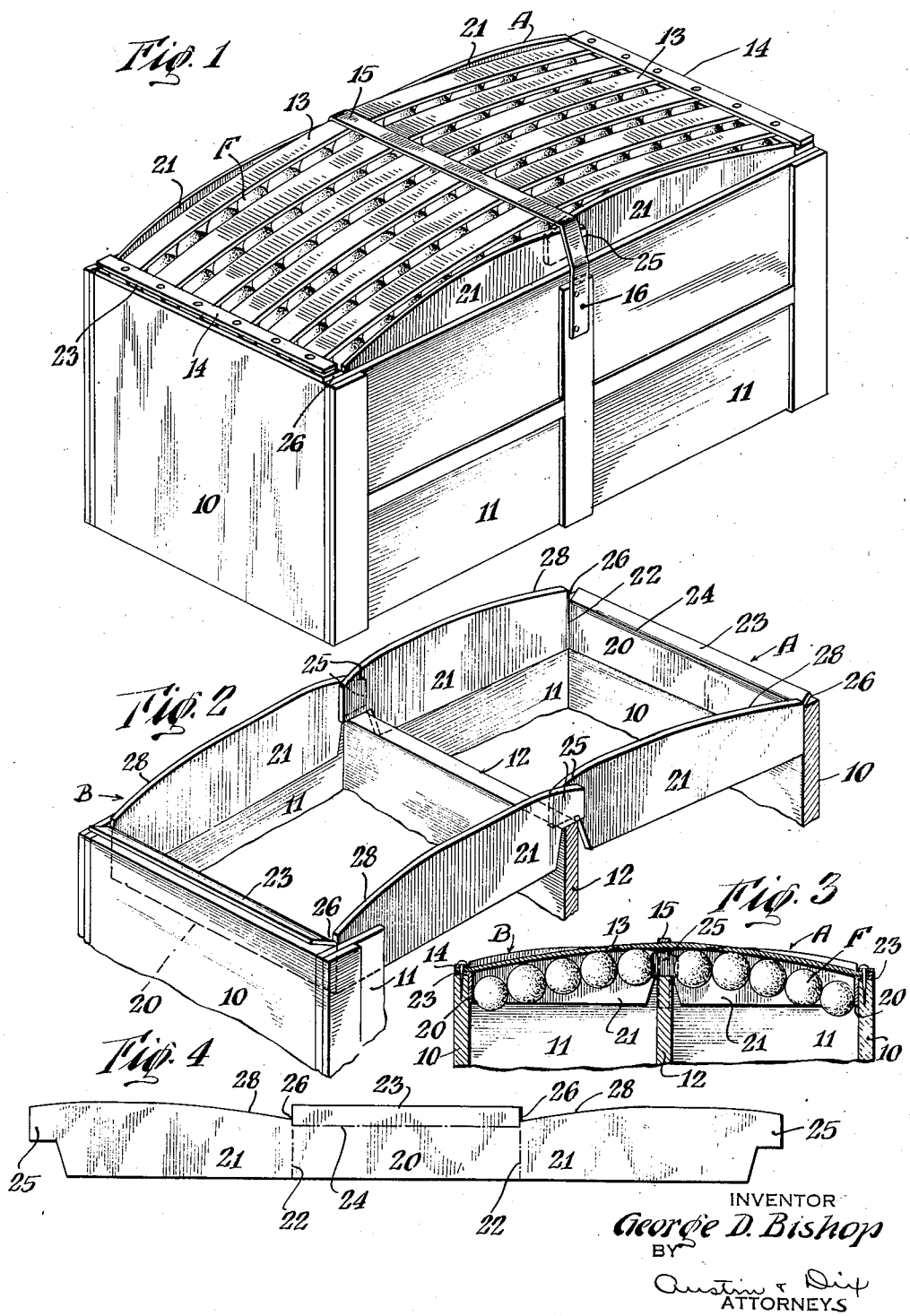

Patented Mar. 1, 1938

2,109,765

UNITED STATES PATENT OFFICE 2,109,765

PACKAGING OF FRUITS AND VEGETABLES

George D. Bishop, Sanford, Fla., assignor to Crown Paper Company, Sanford, Fla., a corporation of Delaware Application May 12, 1933, Serial No. 670,634

4 Claims. (Cl. 217—3)

This invention relates to the packaging of fruits and vegetables and more particularly to a fruit package in which the top layer of fruit is shielded and protected against injury during packing and shipping.

In packing citrus fruits, such as oranges, grapefruit and lemons, the top layer of fruit is generally allowed to extend a substantial distance above the sides of the box or crate. When the cover slats are applied to the box, pressure is exerted thereon sufficient to force the ends of the slats down against the ends of the box, the cover then assuming a bowed or bulged contour. Fruit guards of paperboard material are positioned within the box and normally close the space between the top edge of the box side walls and the bulged cover member. Difficulty has heretofore been encountered in maintaining the fruit guards in position to properly protect the fruit during shipment and handling of the containers or packages. Due to misadjustment of the fruit guards from their proper position, the skins of the fruit become injured which causes rapid decomposition and decay of the top layer of fruit.

The fruit package as herein disclosed is an improvement over the fruit package shown and described in my prior Patent No. 1,799,497, dated April 7, 1931. This invention more particularly comprehends means for preventing the ends of the fruit guard becoming displaced from their proper position so as to leave the fruit without proper protection. This is accomplished by the provision of my novel package combination, which comprises a two compartment box having a U-shaped fruit guard positioned within each compartment. The ends of the fruit guards are provided with shoulder portions which rest upon or extend across the transverse center wall of the box, the ends of the fruit guards being of sufficient length to overlap one another. After the fruit has been placed in the box compartments the ends of the cover slats are pressed down and secured to the end walls of the box. The top layer of fruit extends above the side walls of the box causing the cover slats to assume a bulged contour. The side wall portions of the guards are shaped to substantially conform to the bulged contour of the cover. A strap is then positioned over the cover member in such a position as to extend over the overlapped ends of the side wall portions of the fruit guards, the ends of the strap being secured to the side walls of the box. As thus arranged, the strap provides an abutment which prevents the side wall portions of the fruit guards from being drawn out of the box during shipment and handling or otherwise becoming displaced from their proper fruit protecting position.

It is an object of this invention to provide a fruit package comprising a packing box, cover member and fruit guard combination which fully protects the fruit during shipment and handling, means being provided for holding the fruit guards in fixed fruit protective position.

Another object of this invention is to provide a pair of complementary fruit guards which are adapted to be positioned within adjacent compartments of a packing box, the guards being provided with means which mutually cooperate to hold the guards in proper adjustment position within the box.

Still another object of this invention is to provide a combination fruit guard and packing box which fully protects the fruit from abrasions and injury during packing, shipment and handling.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a perspective view of a fruit package as it appears when fully packed;

Fig. 2 is a prospective view of a two compartment packing box and associated fruit guards, certain parts of the box being broken away to more clearly show the construction;

Fig. 3 is a vertical longitudinal cross sectional view through the top portion of the packing box, cover member and associated fruit guards showing the cover member permanently nailed in place; and Fig. 4 is a plan view of the blank from which the fruit guard is formed.

Like reference characters denote like parts in the several figures of the drawing.

Referring more particularly to Figures 1, 2 and 3 of the drawing, there is shown a two compartment box comprising end walls 10, side walls 11, and a transverse center wall 12. A fruit guard A is shown seated within and extending around the walls of one compartment, and a complementary guard B of the same shape and form is shown extending around the walls of the other compartment. Each of the fruit guards A and B comprises an end wall portion 20, which seats along the inside face of the end wall 10 of the box, and side wall portions 21 which seat along the side walls of the box and are separated from the end wall portion 20 by the score lines 22. The end wall portion 20 is provided with a lip 23 separated therefrom by the score line 24 and from the side wall portions 21 by the cuts 26. The lip portion 23 is adapted to be bent back to rest against the top edge of the end wall 10 of the box, as shown more particularly in Figures 2 and 3. The side wall portions 21 of the guard extend above the edge of the side walls of the box to protect the top row of fruit packed therein. Each of the guards A and B is provided with a shoulder portion 25, the lower edge of which seats on top of or extends across the transverse center wall 12 of the box. The lip portions 23 and the shoulder portions 25 prevent the guards from falling into the box compartment.

During shipment and handling it has been found that the fruit guard often works itself up and out of the crate so that the fruit becomes damaged by striking the sides and ends of the box. To prevent this from occurring the shoulder portions 25 are made of sufficient length to overlap one another for some distance, as shown in Figures 1, 2 and 3. When the fruit guards have been placed in position, the fruit F is packed within the box. It is important that the fruit be tightly packed in order to prevent movement thereof during shipment and handling since any movement of the fruit is liable to cause injury thereto. The cover member comprising the slats 13 and the end wall strips 14 are then nailed or otherwise secured to the end walls of the box. The closely packed fruit causes the cover member to assume a bulged contour, as clearly shown in Figures 1 and 3. The top edge 28 of the side wall portions 21 of the fruit guards are preferably curved to substantially conform to the bulged contour of the cover member.

To hold the side wall portions 21 of the fruit guards against possible displacement, a strap or band 15 of metal or other strong bendable material is provided. The strap 15 extends completely across the cover member and is positioned to extend over the overlapped shoulder portions 25 of the fruit guards, as clearly shown in Figures 1 and 3. The ends of the strap 15 are secured as by nails 16 or other means to the side walls 11 of the box. It will be noted that when the strap member 15 is thus arranged, the ends of the side wall portions will overlap and seat against the inside face of the strap member so that the side wall portions of the fruit guards cannot be removed without demolishing the same. The guards when made and positioned within the box, as above described, and thus held in place by the encircling band 15, permanently retain their proper fruit protecting position notwithstanding rough handling, which such fruit packages generally receive during shipment and storage.

It is understood that the fruit guard and package combination herein disclosed may be used for the packing of many different kinds of fruit and vegetables and other materials which may become injured during packing and transit. The term "fruit guard", as used in the specification and claims, should, therefore, be so interpreted.

While certain novel features of the invention have been disclosed and are pointed out in the annexed claims, it will be understood that various omissions, substitutions and changes may be made by those skilled in the art without departing from the spirit of the invention.

What is claimed is:

1. A fruit package including in combination a compartment box having side and end walls and a transverse center wall, a fruit guard of paperboard material mounted within each compartment adjacent the top row of fruit, each of said fruit guards having side wall portions extending along the side walls of the box, the ends of said side wall portions extending across said transverse center wall and arranged in overlapping relationship, a box cover, and a strap extending over the box cover, over the overlapping ends of said side wall portions and secured to the box side walls, said strap being operative to retain said side wall portions in fixed position, and of sufficient width to prevent cutting of said guards.

2. A fruit package including in combination, a compartment box having side and end walls and a transverse center wall, a fruit guard of paperboard material mounted within said compartment adjacent the top row of fruit, each of said guards having a side wall portion extending along a side wall of the box, the ends of said side wall portions extending across said transverse center wall and arranged in overlapping relationship, a box cover, and a strap extending between the cover and box side wall and over the overlapping ends of said side wall portions for retaining said side wall portions in fixed position during shipment and handling of the package.

3. A fruit package including in combination, a compartment box having side and end walls and a transverse center wall, a fruit guard of paperboard material mounted within each compartment adjacent the top row of fruit, each of said guards having a side wall portion extending along a side wall of the box, the ends of said side wall portions extending across said transverse center wall and arranged in overlapping relationship, a strap extending between the cover and box side wall and over the overlapping ends of said side wall portions maintaining said side wall portions in fixed position during shipment and handling of the package, and a box cover adapted to bulge outwardly, the top edge of said side wall portions being curved to substantially conform to the bulged contour of the box cover.

4. A fruit package including in combination a compartment box having side and end walls and a transverse center wall, a pair of U-shaped fruit guards positioned within said box between the box walls and the top layer of fruit, the center portion of said guards being in contact with the ends of the box, the side wall portions of the guard extending along the side walls of the box, the ends of said side wall portions being formed with extensions of substantial length extending entirely across said transverse center wall thereby to prevent disengagement therefrom during shipment and handling of said package and arranged in overlapping relationship, a strap extending over the box cover over the overlapping ends of said side wall portions and secured to the box side walls, said strap being operative to retain the overlapping ends of said side wall portions in fixed position during shipment and handling of the package.

GEORGE D. BISHOP.